United States Patent [19]

Nasser et al.

[11] 4,182,132
[45] Jan. 8, 1980

[54] APPARATUS FOR THE COOLING AND DEHUMIDIFICATION OF AMBIENT AIR IN REGIONS HAVING A HOT AND HUMID CLIMATE

[75] Inventors: Gamal El Din Nasser, Puchheim; Anton Poernja, München, both of Fed. Rep. of Germany

[73] Assignee: Linde Aktiengesellschaft, Wiesbaden, Fed. Rep. of Germany

[21] Appl. No.: 871,987

[22] Filed: Jan. 24, 1978

[30] Foreign Application Priority Data

Jan. 26, 1977 [DE] Fed. Rep. of Germany ....... 2703114

[51] Int. Cl.² .................. F25D 17/06; F28C 1/00; F25D 21/00
[52] U.S. Cl. .................................... 62/93; 62/121; 62/272; 62/419
[58] Field of Search .................. 62/93, 121, 271, 272, 62/419

[56] References Cited

U.S. PATENT DOCUMENTS

| | | | |
|---|---|---|---|
| 1,993,635 | 3/1935 | Towt | 62/121 |
| 2,362,729 | 11/1944 | Smith | 62/93 |
| 2,682,758 | 7/1954 | Harris | 62/93 |
| 3,122,893 | 3/1964 | Millman | 62/93 |
| 3,675,442 | 7/1972 | Swanson | 62/93 |
| 3,991,820 | 11/1976 | Huggins | 62/93 |

*Primary Examiner*—Lloyd L. King
*Attorney, Agent, or Firm*—Karl F. Ross

[57] ABSTRACT

Tropical and subtropical regions having high ambient temperatures and relative humidity can be locally subjected to cooling and dehumidification according to the invention by a tower in which, upon a post or other vertically extending support, a pair of vertically aligned spaced apart air guides are provided. The lower air guide includes the cooler which can simultaneously condense moisture from the air while the upper air guide can include a heat dissipator of a refrigeration cycle, the air guides being associated with respective blowers and inducing ambient air into the air guide at a location between them and displacing the air through the air guides into heat exchanging relationship. The tower can also be used to collect potable (drinking) water by condensation from the atmosphere.

10 Claims, 2 Drawing Figures

4,182,132

APPARATUS FOR THE COOLING AND DEHUMIDIFICATION OF AMBIENT AIR IN REGIONS HAVING A HOT AND HUMID CLIMATE

FIELD OF THE INVENTION

The present invention relates to an apparatus and a process (or method) for modifying the temperature and/or relative humidity of the air at a location normally subject to high temperatures and high relative humidity. More particularly, the invention deals with an apparatus which can be mounted in a region in which the atmospheric living conditions are poor, because of high temperatures and humidity, to improve these living conditions.

BACKGROUND OF THE INVENTION

It is known that there are many areas of the earth, usually subtropical and tropical regions, in which living conditions for Europeans and others accustomed to temperate climatic conditions and the indigenous population may involve considerable discomfort and even unhealthy ambient weather environments because of high daytime or nightime temperatures and high relative humidity. Typical of such hot and damp climates are those which prevail in the Persian Gulf regions, for example, in Bahrein, in which summertime average temperatures may be 32° C., the sea water temperature can be 31° C. and the relative humidity of the ambient air can be 70%.

Living conditions in such regions, especially in cities and towns in which the street temperature is still higher because of radiation of heat from the walls of the buildings flanking the street, can be difficult because of the heat and humidity. The problem is intensified by the fact that internal living conditions frequently require central or room air conditioning and in most cases the heat abstracted from the building interiors is discharged into the street as well. The air conditioners used in such cases are usually powered by electricity and most of the electrical energy employed ultimately is transformed into heat which is introduced into the environment surrounding the buildings in such towns.

A further problem in such regions is often the availability of a suitable source of potable or drinkable water. In such locations, the ground water level is customarily very low and evaporation of water occurs at a high rate. Thus one must use very deep wells where subsurface water is available, or produce drinkable water by complex energy-consuming processes such as salt water desalination. The latter expedients are only applicable in coastal regions and more inland areas thus must be supplied with water by expensive transport systems, e.g., subsurface pipelines.

OBJECT OF THE INVENTION

It is an object of the present invention to provide an apparatus for the climatic modification of a region having a hot and damp climate and thereby improve the living conditions for people with the minimum possible energy costs.

Another object of the invention is to provide an improved apparatus which is of relatively low capital cost and is capable of generating a supply of potable (drinkable) water in regions having hot damp climates.

It is also an object of the invention to provide an improved method of improving the climatic conditions of tropical and subtropical regions subject to high temperatures and high humidity.

SUMMARY OF THE INVENTION

These objects and others which will become apparent hereinafter are attained, in accordance with the present invention, by providing a unit adapted to be disposed outside of any enclosing structure directly in the ambient air of an open region subject to high temperature and humidity and which includes a refrigeration unit.

According to the invention, the apparatus comprises at least two air guide passages and at least one ventilator or blower for drawing ambient air into and displacing it through the air guide passages, one of the air guide passages including an air cooler and moisture condenser of the refrigeration cycle while the other air guide passage includes a heat dissipator thereof. The refrigeration cycle may either be of the adsorption or of the compressor refrigerant circulation type and, at least in the latter case, the air cooler in the first air guide passage can be the evaporator of the refrigeration cycle while the heat dissipator is the condenser thereof. In the following description, reference to "evaporator" and to "condenser" will be made with the understanding that, in the refrigeration cycle, the refrigerant is vaporized in the evaporator and is liquefied in the condenser. Naturally, the evaporator should not be confused with the condenser of the refrigeration cycle in spite of the fact that ambient moisture from the air may condense upon the external surfaces of this evaporator.

In the system of the present invention, the latent heat of liquefaction of the refrigerant is transferred to a partial stream of the ambient air drawn into the system. Simultaneously, a second partial stream of ambient air is cooled by passing in heat exchange relationship along the evaporator.

According to an embodiment of the invention, the cold air sinks as a result of its greater specific gravity toward the ground while the specifically lighter air, warmed by abstracting heat from the condenser, rises and therefore does not tend to mix with the cold air.

When the apparatus is provided in the form of an upright tower, it can serve effectively to cool and dehumidify large regions close to the ground and hence the environment in which the population is to be found. A mixing of the cold and warm air streams is practically completely avoided and hence the apparatus operates at high efficiency.

The evaporator can be a conventional heat exchanger of, for example, the tube, plate or corrugated-surface type, although it preferably is a cylindrical throughflow heat exchanger having a vertical axis and traversed by the air stream from the interior to the exterior, i.e., generally radially.

Advantageously, the evaporator is so constructed that it permits recovery of water from the air stream, the water precipitating or condensing on the surfaces of this heat exchanger being collected so as to make available a source of sweet water for drinking and like purposes.

More particularly the evaporator can be constituted as a plate-type heat exchanger having ribs provided between the plates and formed with foils. The air can pass between the plate and be deflected by the ribs of the foils with condensation occurring upon the ribs with the droplets of water which collect thereon being accumulated and led away to a receptacle within the tower.

For greatest uniformity in air cooling, a number of such towers can be distributed over the area to be climatically controlled at locations which depend upon the prevailing wind direction and the like. Care whould be taken to dispose the apparatus in regions free from ground contours which will interfere with the uniform distribution of the cold air. The height of the cold air outlet may also be selected with these conditions in mind. Furthermore, a plurality of units can be provided at any one location and more than one unit can be connected to a compressor to operate several refrigeration cycles.

According to a feature of the invention, each of the air guide passages comprises an air-intake opening formed with a respective forced-draft means, preferably a blower, and downstream of this opening in the direction of air flow, with a respective heat exchanger constituting the evaporator or condenser. The heat exchangers may form cylindrical shafts closed at their ends remote from the respective openings and spacedly surrounded by cowling or ducts which are coaxial with the heat exchangers and guide the air streams radially traversing same upwardly or downwardly in the manner described previously. The ducts serve to discharge the air into the atmosphere.

To avoid mixing of the cold and warmed air streams reliably, it is advantageous to dispose the two air guide passages vertically and to space one above the other so that the housing of the upper air passage is upwardly open and the housing of the lower air passage is downwardly open. A gap may be provided between the two intake openings to serve as an air-inlet passage for the ambient air. Thus at the very minimum the cold and warm air stream are separated by the vertical distance between the outlet of the two air guide passages.

This tower construction enables the ambient air to be drawn into the system at an intermediate location along the height of the tower but nevertheless well above the ground level and above the cold air layer lying upon the ground. The air drawn into the system is induced into the apparatus at a level well below the warm air which is discharged from the upper end of the tower and hence is not unduly heated thereby.

The air drawn into the system is partly forced through an air guide channel upwardly through the condenser of the refrigeration system and partly is forced downwardly through the evaporator of the refrigeration system. The cold air emerging downwardly from the lower air guide passage sinks to the ground unimpeded and does not mix with the warm air stream discharged pwardly. The formation of a mist in the region between the warm and cold air zones is mitigated by the particular construction described above and, of course, by the direct solar radiation upon these layers.

Advantageously, the lower air guide passage is mounted upon a support post which can widen outwardly at its upper end and receive a collecting vessel for the water condensing upon the cold surface of the evaporator. The lower portion of the post can be relatively slender. The post can be a concrete column whose height will exceed the height of the largest buildings in the area and which can be made hollow to receive the refrigerant and water-distribution lines.

It has been found to be advantageous to mount the post upon a foundation recessed in the ground, the compressor for the refrigeration cycle being mounted upon this same foundation. The resulting unit is highly compact and the various parts can be prefabricated in a factory and in identical configuration and assembled at the site desired for each of the towers.

It has also been found to be advantageous to be able to reverse the forced-draft direction of the blower in the air-guide passage containing the evaporator and to provide the wall of the duct or housing surrounding the evaporator with closeable openings. During periods of low air temperature and higher relative humidity, for example during the night or during winter months, the apparatus can be used primarily as a system for recovering drinking water since the generation of cold air is not desired.

In this case, the air is drawn into the lower air guide passage at the lower end thereof and through the openings in the wall of the lower duct and is discharged upwardly. The two blowers thus operate in tandem and in the same direction.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
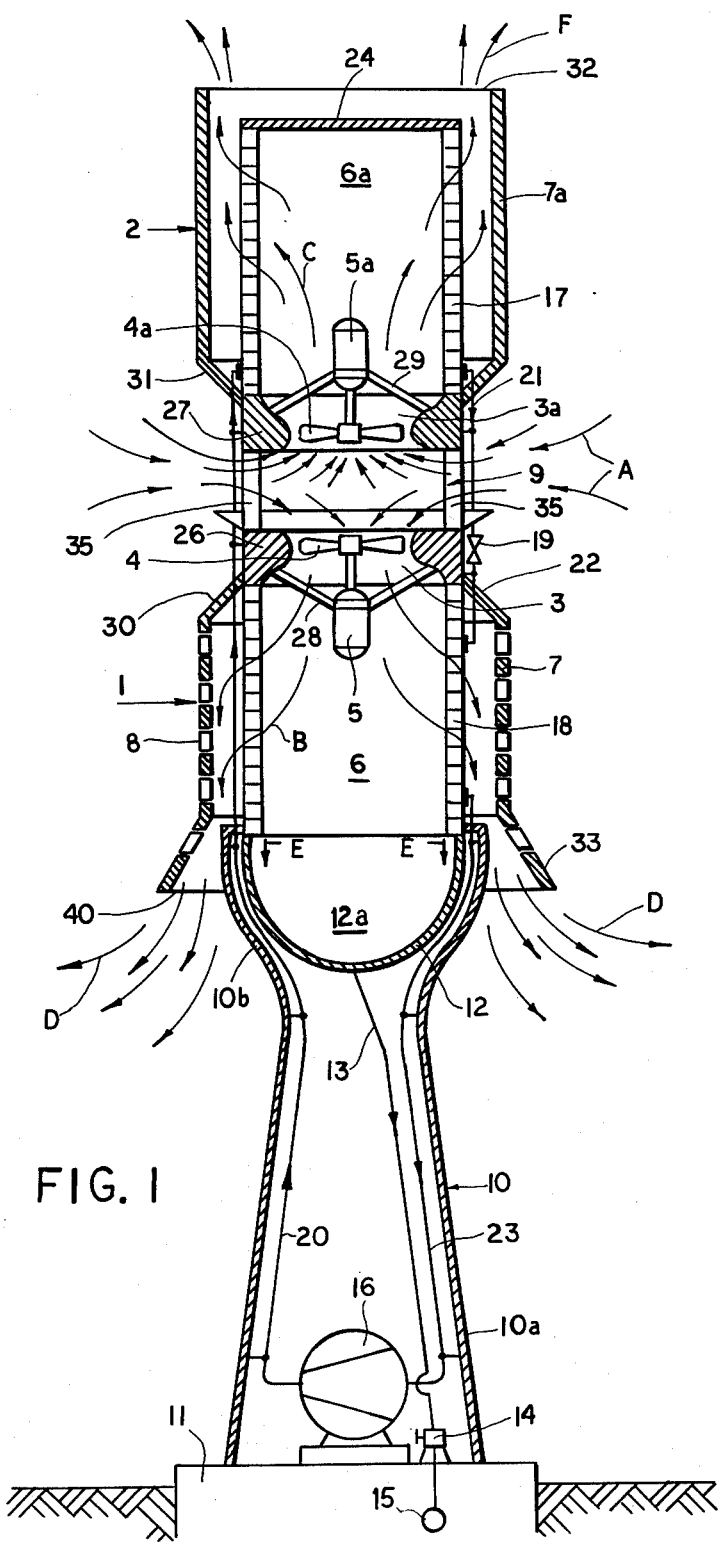
FIG. 1 is a vertical cross-sectional view in somewhat diagrammatic form, of an apparatus in accordance with the present invention for cooling and dehumidifying air and recovering potable water therefrom.

In the drawing identical reference numerals in the two figures represent identically functioning parts.

Figure 2:
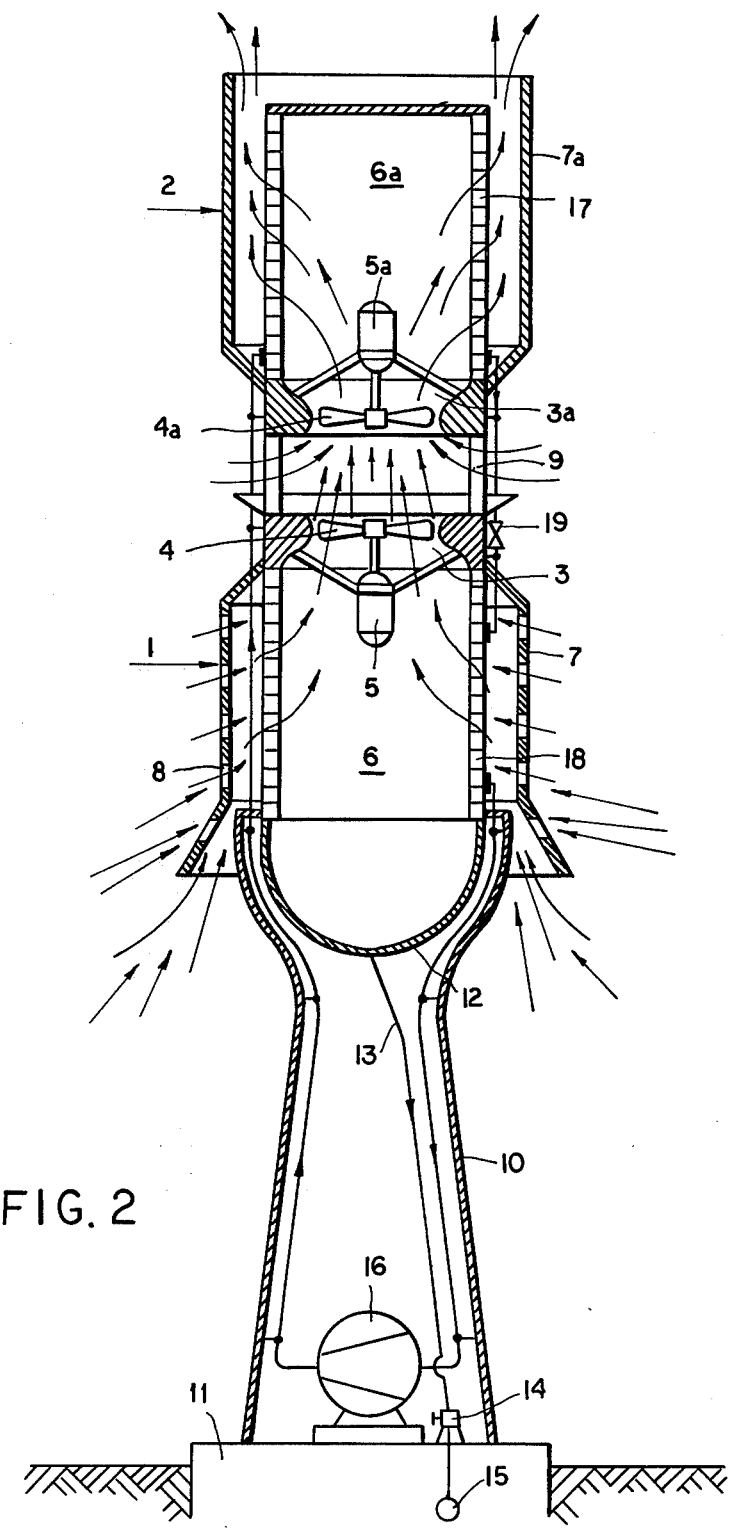
FIG. 2 is a similar view of an apparatus for the principal purpose of collection of drinkable water.

In FIGS. 1 and 2, the apparatus comprises a pair of vertically extending (upstanding) air-guide passages 1 and 2 disposed one above the other and supported by a post 10 upon a foundation 11. Within the hollow post 10 and mounted upon this foundation, there is a compressor 16.

An evaporator 18 is provided in the lower air passage 1 while the upper air passage 2 receives the condenser 17, the condenser, evaporator and compressor being connected, together with an expansion valve 19 between the evaporator and the condenser, in a conventional refrigeration cycle.

In other words, a refrigerant, e.g., a fluorochlorhydrocarbon such as a conventional FREON-type refrigerant is compressed in the compressor 16 and is fed via line 20 to the condenser 17 in which it is condensed or liquefied, thereby dissipating heat to the air traversing the channel or passage 8, the liquefied refrigerant being expanded in valve 19 prior to entering the evaporator 18 and further expanding therein to abstract heat from the air traversing the lower guide passage or channel 1. Thus the condenser 17 is connected by a line 21 to the expansion valve 19 which is connected by line 22 to the evaporator 18. A line 23 connects the evaporator to the input side of the compressor 16.

The condenser 17 is an annular throughflow heat exchanger, i.e. is traversed by air generally radially and is closed at its upper end axially by a cover 24. The condenser 19 is also an annular heat exchanger traversed by air radially and is closed at its lower end by a downwardly convex bell 12.

The air guide passages 1 and 2 each comprise an air intake passage 3 and 3a axially aligned with the interiors 6 and 6a of the respective heat exchangers 18 and 17, the passage 3 being defined by a constricting body 26 while the passage 3a is defined by a constricting body 27, the two constricting bodies 26 and 27 being vertically spaced and axially and vertically aligned.

Instead of a compression refrigeration cycle, absorption refrigeration cycle may be used (see PERRYS' CHEMICAL ENGINEERS' HANDBOOK, McGraw-Hill Book Co., New York 1963, Chapter 12, pgs. 2–13).

Each of the air intake passages 3 and 3a is provided with a forced-draft means, e.g., a fan 4 or 4a driven by a motor 5 or 5a supported upon the respective constricting body 26, 27 by struts 28 and 29 respectively.

The air guide passages 1 and 2 are each also constituted by a respective cylindrical housing 7 and 7a which are affixed by frustoconical portions 30 and 31 to the exteriors of the bodies 26 and 27 and reach respectively downwardly and upwardly while spacedly surrounding the respective heat exchangers, namely, the evaporator 18 and the condenser 17.

At its upper end, the housing 7a is open as shown in 32 while, at its lower end, the housing 7 is extended by a frustoconically downwardly divergent air distributor 33.

The housing 7 of the lower air guide passage is provided with closeable openings 8 which have been shown only diagrammatically and can be provided with individual shutters such as rings with openings which rotate selectively into and out of alignment with the openings 8. The type of shutter which is used is immaterial and hence the shutters have not beeen illustrated in detail. For example, the shutters can include disks which rotate relative to one another to align or disalign sectoral-shaped openings.

The two air guide passages 1 and 2 are spaced apart, e.g., by vertical struts 35 to define between them an air intake opening 9 through which ambient air can be drawn into the system as represented by the arrows A.

To facilitate assembling the tower formed by the structure described proviously, the air intake passages 1 and 2, with the respective bodies 3, 3a, heat exchangers 18 and 17, shrouds 7 and 7a, and blowers 4, 5 and 4a, 5a, can be prefabricated as individual units and mounted at the desired site upon the post 10 and upon one another via the struts 35.

The choice of site at which the tower is to be provided, will depend upon the conditions in the region and will be determined by, for example, prevailing wind directions, soil or ground conditions (since the system must be mounted upon a foundation) and the presence or absence of buildings, ground contours (hills or valleys or rock or outcrops) in the region—since the latter will restrict the distribution of the cooled airstream. The number of units to be provided is dependent upon the size of the region in which the air is to be treated and the capacity (air throughput and degree of cooling) of the apparatus. Naturally, the height of the air-discharge opening 40 should also be low enough to provide the cooled air in the region in which it will be of assistance to the particular living in the region or passing through the same and not fully dissipated by the prevailing winds.

The post 10 may have an upwardly converging frusto-conical main portion 10a which, at its upper end 10b is belled outwardly to conform to the outer diameter of the evaporator 18 forming the shaft 6. In the region of this outwardly belled portion, the downwardly domed cover 12 can be provided to form a reservoir for water condensing along the inner surfaces of the evaporator 18. This sweet or drinkable water may be withdrawn from the tank 12a via a line 13 which can communicate through valve 14 with the drinking water distribution lines 15 in the ground of the municipality or other region in which the tower is provided.

For the normal opening of the apparatus during the day, i.e., for air-cooling and sweet water recovery, the fans 4 and 4a draw warm ambient air into the tower through the intake opening 9 in the direction of arrow A and force the air in two partial streams through the lower shaft 6 and the upper shaft 6a as represented by the arrows B and C.

The air traversing the evaporator 18 in the direction of arrows B is thereby cooled and hence cold air is distributed and dispersed downwardly in the direction of arrows D, water being recovered and passing into the tank 12a in the direction of arrows E. The heat is discharged in the partial airstream C which emerges at the upper end in the direction of arrows F as a warm airstream.

The intake power of the blowers 4 and 4a are so dimensioned that the larger portion of the ambient air is forced through the upper air guide channel containing the condenser of the refrigeration unit to ensure sufficient heat abstraction therefrom.

Since the cold air directed downwardly sinks because of its greater specific gravity, a cold air layer is provided over the region which is to be treated to a level depending upon the height of the support post 10. The upwardly directed warm air thus does not mix with the lower layer of cold air. The condenser from the airstream which is cooled is collected in the reservoir 12 for further use.

FIG. 2 shows the system of FIG. 1 as it is employed for the recovery of potable water exclusively during winter or evening operations, for example, where ground-level cooling is not required. In this case, the openings 8 are unblocked and the blower 4 is reversed.

The environmental air is thus drawn inwardly through the lower air guide passage 1 and the intermediate air intake 9 and passes through both the evaporator 18 and the condenser 17. On the evaporator 18, a condensate forms which is collected in the reservoir 12. This arrangement permits a much larger quantity of environmental air to traverse the cooling surfaces of the evaporator 18 and thus gives rise to a high rate of production of potable water.

We claim:

1. An apparatus for modifying the climate of a region having a hot moist climate which comprises:
refrigeration means operating in a refrigeration cycle and having an evaporator and a condenser for a refrigerant,
means defining at least two air guide passages including a first air-guide passage provided with said evaporator and a second air-guide passage provided with said condenser;
respective forced-draft means for inducing respective flows of ambient air through said passages in heat-exchanging relationship with said evaporator and said condenser respectively; and
means for supporting said evaporator, said condenser, said air-guide passages and said forced-draft means above the ground and in an unenclosed free space, said evaporator and said condenser define respective axially-extending shafts in said first and second passages respectively, each of said shafts being closed at one end, each of said passages being formed with an air inlet at the opposite end, and a respective duct spacedly surrounding the the evaporator and condenser, said forced-draft means including a blower in each of said inlets whereby air is drawn generally radially through the evaporator and condenser by the respective blower.

2. The apparatus defined in claim 1 wherein said evaporator and said condenser define respective axially-extending shafts in said first and second passages respectively, each of said shafts being closed at one end, each of said passages being formed with an air inlet at the opposite end, and a respective duct spacedly surrounding the evaporator and condenser, said forced draft means including a blower in each of said inlets whereby air is drawn generally radially through the evaporator and condenser by the respective blower.

3. The apparatus defined in claim 1 wherein each of said air guide passages is disposed vertically, said second air guide passage being spaced above said first air guide passage, said inlets of said air guide passages being spacedly juxtaposed and defining an intake open to ambient air between them, said support including a post elevating the bottom of said first air guide passage above the ground.

4. The apparatus defined in claim 3 wherein the support post has an upwardly widening upper end receiving a reservoir for condensate forming upon surfaces of said evaporator, said refrigerating means including a compressor in said post at the base thereof.

5. The apparatus defined in claim 3 wherein said blower of said first air guide passage is reversible and the wall of said duct of said first air guide passage is formed with closeable openings.

6. The apparatus defined in claim 3 wherein said evaporator is formed as a tube heat exchanger.

7. The apparatus defined in claim 3 wherein said evaporator is a plate heat exchanger.

8. A method of modifying the climate in a hot and humid region which comprises:
    drawing a portion of ambient air in a first partial stream through a first air guide passage over an evaporator to cool the air traversing said first air passage;
    drawing another portion of the same ambient air in a second partial stream through a second air guide passage provided with a condenser to abstract heat from said condenser;
    circulating a refrigerant between said evaporator and said condenser to heat said condenser and cool said evaporator in a refrigeration cycle;
    controlling the flows of air through said passages so that the throughflow of air through said second passage is greater than the throughflow of air through said first passage; and
    discharging both said flows into the same open space while allowing a cooler flow from said first stream to settle while a warmer flow from said second stream is permitted to rise by the difference in the densities of the cooler and warmer flows.

9. The method defined in claim 8, further comprising the step of collecting water condensed from the ambient air on surfaces of said evaporator for use as drinking water.

10. The method defined in claim 9, further comprising the step of reversing the flow of air through said first air guide passage to increase the collection of water from the ambient air.

* * * * *